(12) United States Patent
Kurian et al.

(10) Patent No.: US 10,997,375 B2
(45) Date of Patent: May 4, 2021

(54) SYSTEM FOR SELECTIVE DATA CAPTURE AND TRANSLATION

(71) Applicant: Bank of America Corporation, Charlotte, NC (US)

(72) Inventors: Manu Kurian, Dallas, TX (US); U. Divya, Hyderabad Telangana (IN)

(73) Assignee: Bank of America Corporation, Charlotte, NC (US)

( * ) Notice: Subject to any disclaimer, the term of this patent is extended or adjusted under 35 U.S.C. 154(b) by 139 days.

(21) Appl. No.: 16/190,682

(22) Filed: Nov. 14, 2018

(65) Prior Publication Data

US 2020/0151261 A1    May 14, 2020

(51) Int. Cl.
*G06F 40/58* (2020.01)
*G06N 20/00* (2019.01)

(52) U.S. Cl.
CPC ............ *G06F 40/58* (2020.01); *G06N 20/00* (2019.01)

(58) Field of Classification Search
CPC .... G06F 40/211; G06F 40/253; G06F 40/268; G06F 40/284; G06F 40/30; G06N 20/00; G06N 20/10; G05B 23/0283
See application file for complete search history.

(56) References Cited

U.S. PATENT DOCUMENTS

| | | | |
|---|---|---|---|
| 9,424,538 B1 | 8/2016 | Buddepalli et al. | |
| 9,559,931 B2 | 1/2017 | Hitchcock et al. | |
| 9,596,202 B1 | 3/2017 | Beach et al. | |
| 9,621,580 B2 | 4/2017 | Buddepalli et al. | |
| 9,977,805 B1* | 5/2018 | Bowman | G06F 16/2246 |
| 10,262,019 B1* | 4/2019 | Reiner | G06F 11/079 |
| 10,365,974 B2* | 7/2019 | Todd | G06F 11/1453 |
| 10,552,739 B1* | 2/2020 | Rausch | H04L 67/1097 |
| 2014/0279747 A1* | 9/2014 | Strassner | H04L 41/085 706/12 |
| 2015/0134795 A1* | 5/2015 | Theimer | G06F 16/254 709/223 |
| 2015/0365369 A1 | 12/2015 | Tokuda et al. | |
| 2016/0014068 A1 | 1/2016 | Farkas | |
| 2016/0277336 A1 | 9/2016 | Sachtjen et al. | |
| 2016/0315897 A1 | 10/2016 | Vitaldevara et al. | |
| 2016/0323296 A1 | 11/2016 | Daniell et al. | |

(Continued)

*Primary Examiner* — Lamont M Spooner
(74) *Attorney, Agent, or Firm* — Banner & Witcoff, Ltd.; Michael A. Springs

(57) ABSTRACT

Systems for selective data capture and translation are provided. In some examples, a system, may receive data from one or more systems, networks, applications, devices, or the like. The data may include data associated with one or more issues occurring at the system, network, application, device, or the like. In some examples, a plurality of data containers may be generated. In some arrangements, each data container may be associated with a different issue, type of issue, system, application, or the like. The data containers may be generated in response to receiving data associated with an issue or may be pre-generated. In some arrangements, the received data may be evaluated (e.g., using machine learning) to determine whether it should be added to one or more data containers of the plurality of data containers. If so, the data may be added and, if not the data may be preserved and/or further evaluated to determine whether it should be added to a different data container.

21 Claims, 10 Drawing Sheets

(56) References Cited

U.S. PATENT DOCUMENTS

| | | | |
|---|---|---|---|
| 2016/0380942 A1 | 12/2016 | Salpe et al. | |
| 2017/0012657 A1 | 1/2017 | Stahlin et al. | |
| 2017/0026389 A1 | 1/2017 | Gatti | |
| 2017/0026411 A1 | 1/2017 | Gatti | |
| 2017/0093640 A1* | 3/2017 | Subramanian | H04L 41/5058 |
| 2017/0142049 A1 | 5/2017 | Ganin et al. | |
| 2018/0121453 A1* | 5/2018 | Jain | G06F 11/1448 |
| 2018/0241813 A1* | 8/2018 | Funk | H04L 67/2819 |
| 2018/0284756 A1* | 10/2018 | Cella | H04L 67/12 |
| 2018/0284758 A1* | 10/2018 | Cella | G05B 23/0229 |
| 2019/0025805 A1* | 1/2019 | Cella | G05B 19/4185 |
| 2019/0033360 A1* | 1/2019 | Solomon | G05B 23/0297 |
| 2019/0033845 A1* | 1/2019 | Cella | G05B 23/024 |
| 2019/0121338 A1* | 4/2019 | Cella | G05B 23/0229 |
| 2019/0121339 A1* | 4/2019 | Cella | G05B 19/41845 |
| 2019/0121343 A1* | 4/2019 | Cella | G06N 3/02 |
| 2019/0121344 A1* | 4/2019 | Cella | G06N 20/00 |
| 2019/0121345 A1* | 4/2019 | Cella | G05B 19/4184 |
| 2019/0121346 A1* | 4/2019 | Cella | G06N 3/0472 |
| 2019/0121705 A1* | 4/2019 | Mayo | G06F 16/2365 |
| 2019/0129406 A1* | 5/2019 | Cella | G05B 23/0294 |
| 2019/0129407 A1* | 5/2019 | Cella | G06N 20/00 |
| 2019/0129408 A1* | 5/2019 | Cella | G05B 23/0297 |
| 2019/0137985 A1* | 5/2019 | Cella | H04W 4/38 |
| 2019/0146472 A1* | 5/2019 | Cella | H04L 67/1097 702/188 |
| 2019/0146473 A1* | 5/2019 | Cella | G05B 23/0229 702/188 |
| 2019/0146474 A1* | 5/2019 | Cella | G06N 3/02 702/188 |
| 2019/0146475 A1* | 5/2019 | Cella | G06N 3/02 702/188 |
| 2019/0146476 A1* | 5/2019 | Cella | G06N 3/0472 702/188 |
| 2019/0146479 A1* | 5/2019 | Cella | G05B 13/028 702/188 |
| 2019/0146480 A1* | 5/2019 | Cella | H04B 17/318 702/188 |
| 2019/0155263 A1* | 5/2019 | Cella | G06N 20/00 |
| 2019/0163539 A1* | 5/2019 | Bishop | G06F 9/5083 |
| 2019/0187680 A1* | 6/2019 | Cella | G06N 3/006 |
| 2019/0187681 A1* | 6/2019 | Cella | G05B 23/0264 |
| 2019/0187682 A1* | 6/2019 | Cella | G05B 19/41875 |
| 2019/0187683 A1* | 6/2019 | Cella | G06N 5/046 |
| 2019/0187686 A1* | 6/2019 | Cella | G05B 23/0291 |
| 2019/0187687 A1* | 6/2019 | Cella | H04L 67/12 |
| 2019/0187688 A1* | 6/2019 | Cella | G06N 3/0454 |
| 2019/0219995 A1* | 7/2019 | Cella | H04B 17/318 |
| 2019/0227536 A1* | 7/2019 | Cella | G06N 3/0445 |
| 2019/0227537 A1* | 7/2019 | Cella | G05B 19/4185 |
| 2019/0243865 A1* | 8/2019 | Rausch | G06F 16/2452 |
| 2019/0324431 A1* | 10/2019 | Cella | H04B 17/309 |
| 2019/0324432 A1* | 10/2019 | Cella | G06N 3/0472 |
| 2019/0324433 A1* | 10/2019 | Cella | G05B 23/024 |
| 2019/0324434 A1* | 10/2019 | Cella | G05B 19/4184 |
| 2019/0324435 A1* | 10/2019 | Cella | G05B 19/4184 |
| 2019/0324436 A1* | 10/2019 | Cella | G05B 19/41875 |
| 2019/0324437 A1* | 10/2019 | Cella | H04L 1/18 |
| 2019/0324438 A1* | 10/2019 | Cella | G06N 3/0472 |
| 2019/0324439 A1* | 10/2019 | Cella | G06K 9/6263 |
| 2019/0324440 A1* | 10/2019 | Cella | G06N 3/0427 |
| 2019/0324441 A1* | 10/2019 | Cella | G05B 23/0264 |
| 2019/0324442 A1* | 10/2019 | Cella | G05B 23/024 |
| 2019/0324443 A1* | 10/2019 | Cella | G06N 3/0454 |
| 2019/0324444 A1* | 10/2019 | Cella | H04L 1/0002 |
| 2020/0019154 A1* | 1/2020 | Cella | G06N 5/046 |
| 2020/0026270 A1* | 1/2020 | Cella | G06Q 30/06 |
| 2020/0074416 A1* | 3/2020 | Mathew | H04L 29/06 |
| 2020/0089210 A1* | 3/2020 | Cella | G05B 19/4183 |
| 2020/0089211 A1* | 3/2020 | Cella | G05B 19/41865 |
| 2020/0089212 A1* | 3/2020 | Cella | G05B 19/41865 |
| 2020/0089213 A1* | 3/2020 | Cella | G05B 13/028 |
| 2020/0089214 A1* | 3/2020 | Cella | G05B 19/4185 |
| 2020/0089215 A1* | 3/2020 | Cella | G05B 23/0294 |
| 2020/0089216 A1* | 3/2020 | Cella | G05B 23/0229 |
| 2020/0089217 A1* | 3/2020 | Cella | H04B 17/318 |
| 2020/0096986 A1* | 3/2020 | Cella | G06N 3/084 |
| 2020/0096991 A1* | 3/2020 | Cella | H04L 1/18 |
| 2020/0096994 A1* | 3/2020 | Cella | G05B 23/0286 |
| 2020/0096995 A1* | 3/2020 | Cella | G05B 23/0221 |
| 2020/0096996 A1* | 3/2020 | Cella | G05B 23/0221 |
| 2020/0096997 A1* | 3/2020 | Cella | H04L 1/0002 |
| 2020/0096998 A1* | 3/2020 | Cella | G05B 23/0289 |
| 2020/0103889 A1* | 4/2020 | Cella | G06N 5/046 |
| 2020/0103890 A1* | 4/2020 | Cella | G05B 23/024 |
| 2020/0103891 A1* | 4/2020 | Cella | G05B 23/0221 |
| 2020/0103892 A1* | 4/2020 | Cella | G05B 19/4184 |
| 2020/0103893 A1* | 4/2020 | Cella | G06N 3/006 |
| 2020/0110397 A1* | 4/2020 | Cella | G06N 3/0472 |
| 2020/0110398 A1* | 4/2020 | Cella | G06N 3/02 |
| 2020/0137097 A1* | 4/2020 | Zimmermann | G06F 21/6218 |
| 2020/0143253 A1* | 5/2020 | Rausch | G06N 3/04 |

* cited by examiner

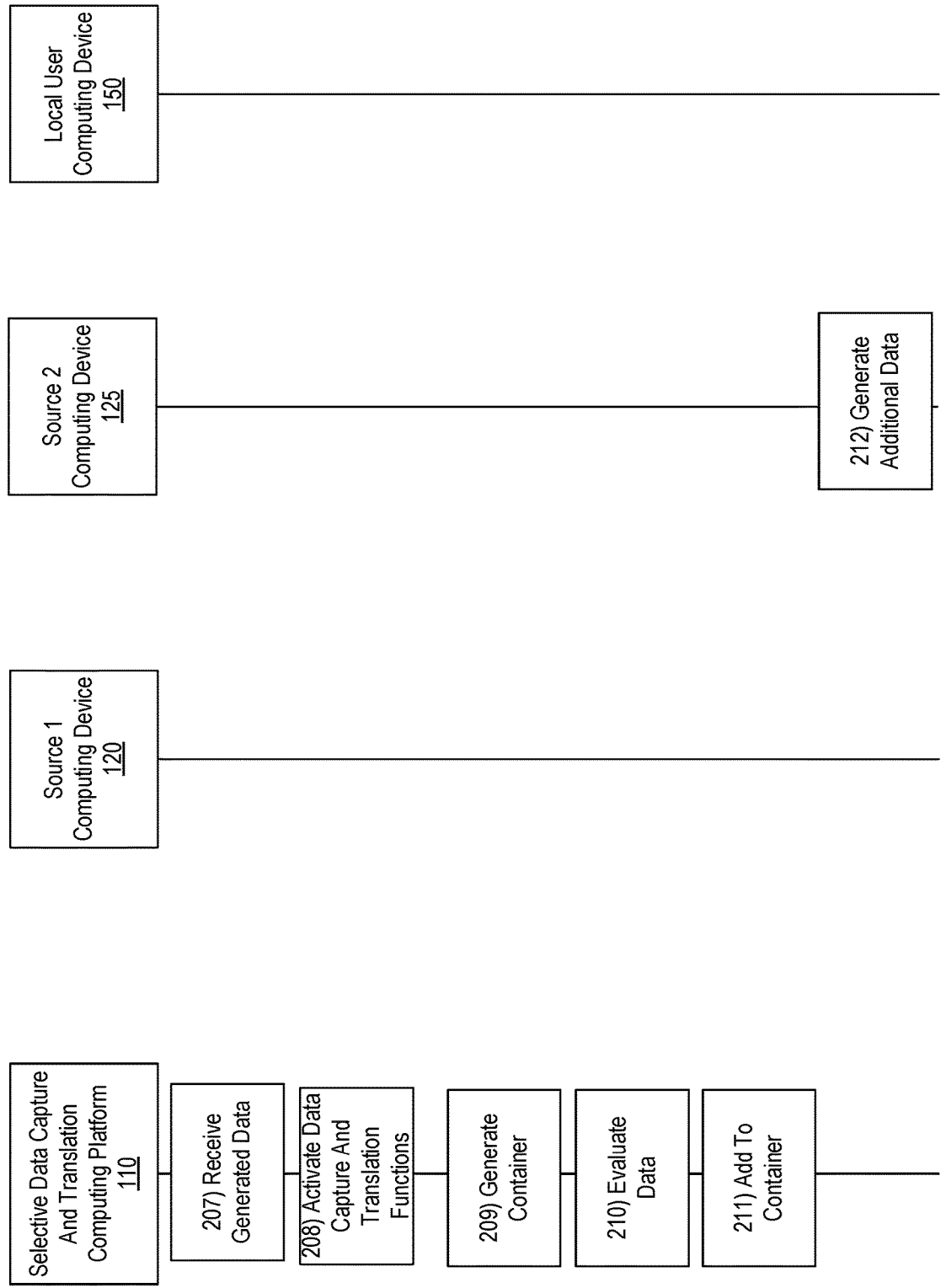

SYSTEM FOR SELECTIVE DATA CAPTURE AND TRANSLATION

BACKGROUND

Aspects of the disclosure relate to electrical computers, systems, and machine learning. In particular, one or more aspects of the disclosure relate to selectively capturing data and translating data.

Large entities often implement various systems that may have issues that may impact services available. As issues arise, data is often collected from multiple sources and is used to evaluate an issue, identify processes to remedy or address an issue, and the like. However, the data received from multiple sources may include data in formats not conducive to use, data from applications, systems, or the like, that are unrelated to the system or application having an issue, and the like. Accordingly, it would be advantageous to provide a system for selectively collecting data for use in evaluating and remedying and issue and providing data translation functions to simplify and improve accuracy in interpretation.

SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

Aspects of the disclosure provide effective, efficient, scalable, and convenient technical solutions that address and overcome the technical problems associated with obtaining and evaluating data associated with a system, network, application or other similar issue.

In some examples, a system, computing platform, or the like, may receive data from one or more systems, networks, applications, devices, or the like. The data may include data associated with one or more issues occurring at the system, network, application, device, or the like. In some examples, a plurality of data containers may be generated. In some arrangements, each data container may be associated with a different issue, type of issue, system, application, or the like.

In some examples, the plurality of data containers (or one or more data containers of the plurality of data containers) may be generated in response to receiving data from the system, network, application, device or the like. Additionally or alternatively, the plurality of data containers (or one or more data containers of the plurality of data containers) may be pre-generated (e.g., before an issue occurs) based on machine learning data, historical data, user experience, or the like.

In some arrangements, the received data may be evaluated (e.g., using machine learning) to determine whether it should be added to one or more data containers of the plurality of data containers. If so, the data may be added and, if not the data may be preserved and/or further evaluated to determine whether it should be added to a different data container.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which:

FIGS. 2A-2E depict an illustrative event sequence for implementing selective data capture and translation functions in accordance with one or more aspects described herein;

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

Some aspects of the disclosure relate to selective data capture and translation.

As mentioned above, identifying system, network, application, or the like, issues quickly and taking steps to reduce or mitigate impact of issues are important functions for any entity or enterprise, particularly those with vast numbers of systems, applications, devices, and the like. However, in some arrangements, the incredible volume of data received makes it difficult or almost impossible to identify relevant data in a timely or efficient manner. In some examples, the data received can cause confusion and delays during troubleshooting of one or more issues. Accordingly, selectively identifying data that should be used to address subsequent issues and storing that data in a manner that enables quick access and use is advantageous.

Aspects described herein are directed to generating data containers to store data associated with particular issues, types of issues, and the like, so that the data is readily accessible and easy to use to address subsequent issues. As discussed more fully herein, aspects are directed to using machine learning to evaluate incoming data in order to determine whether some or all of the data is relevant to a particular issue, whether some or all of the data should be stored in one or more data containers, and the like.

Further, aspects are directed to generated and executing translation layers that enable communication between data containers and translate data from machine readable language to natural language in order to reduce errors and/or discrepancies in interpretation of the data (e.g., by an analyst or other user using data in one or more data containers to address a subsequent issue).

These and various other arrangements will be discussed more fully below.

Figure 1A:
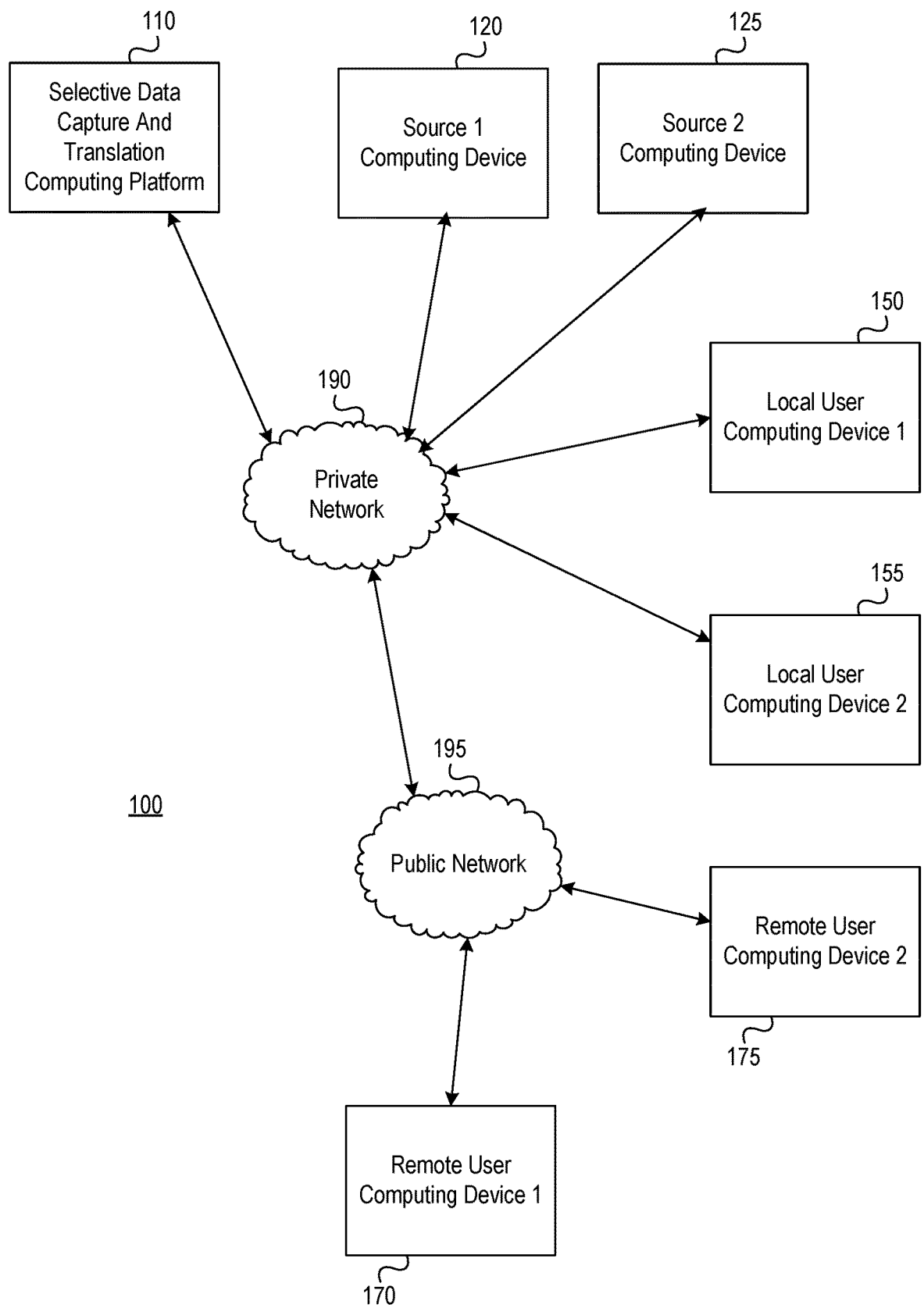
FIGS. 1A and 1B depict an illustrative computing environment for implementing selective data capture and translation functions in accordance with one or more aspects described herein.
Figure 1B:
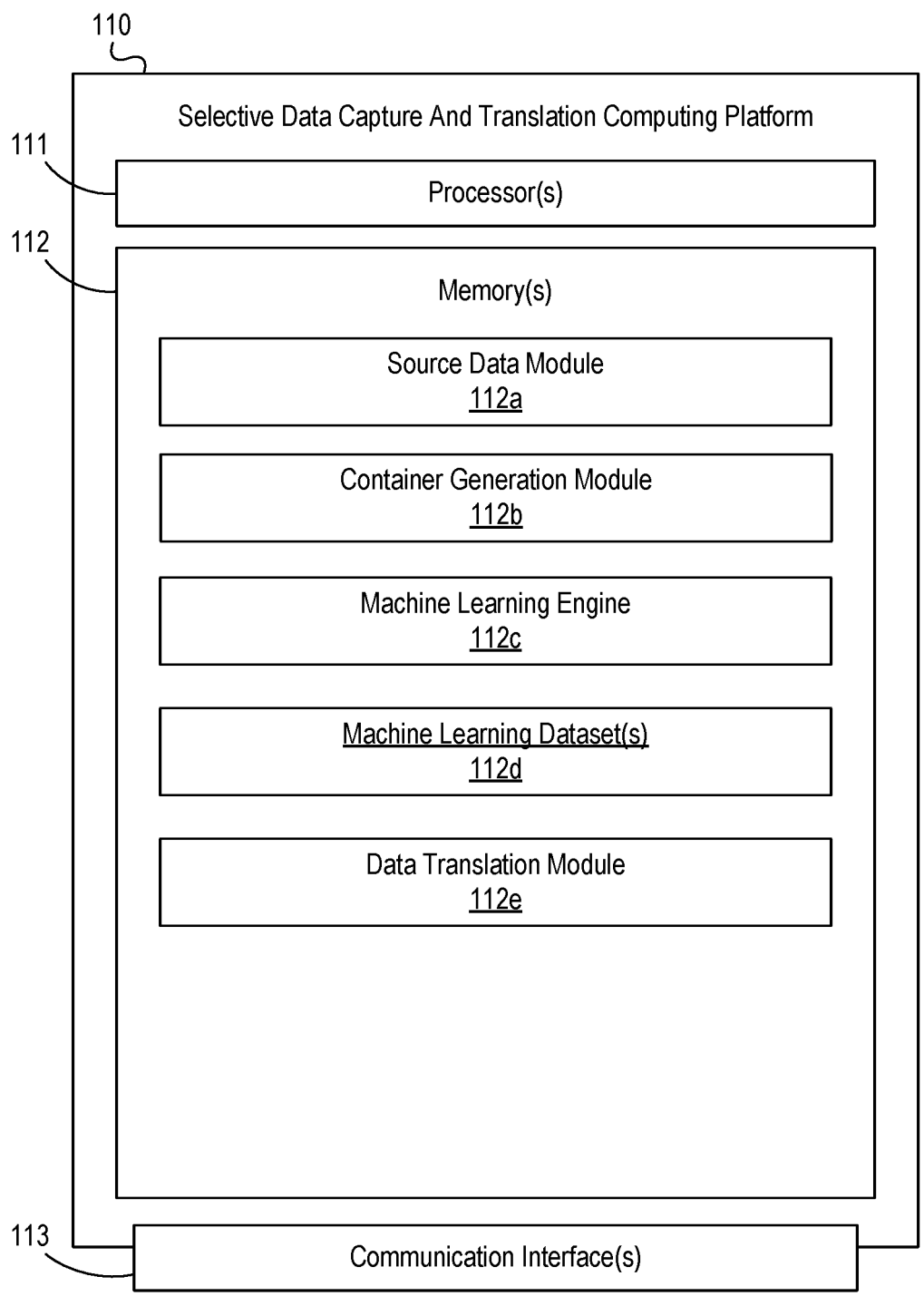

FIGS. 1A and 1B depict an illustrative computing environment for implementing and using a system for selective data capture and translation in accordance with one or more aspects described herein. Referring to FIG. 1A, computing environment 100 may include one or more computing devices and/or other computing systems. For example, computing environment 100 may include selective data capture and translation computing platform 110, a plurality of data source computing devices, such as source computing device 1 120 and source computing device 2 125, a first local user computing device 150, a second local user computing device 155, a first remote user computing device 170, and a second remote user computing device 175.

Selective data capture and translation computing platform 110 may be configured to host and/or execute a machine learning engine to provide intelligent, dynamic selective data capture and translation. For instance, selective data capture and translation computing platform 110 may receive data from one or more sources, such as source computing device 1 120, source computing device 2 125, or the like. In some examples, the data may include data associated with system, device, network, or the like, issues. In some arrangements, the data may include logs associated with one or more issues.

In some examples, the selective data capture and translation computing platform 110 may generate one or more data containers. In some arrangements the data containers may be generated in response to receiving data associated with an issue or may be pre-generated based on one or more criteria. The data container may then be used to store additional data associated with later occurring issues. In some examples, machine learning may be used to evaluate incoming data to determine whether it should be added to one or more data containers. The data within a data container may then be used to address future issues, predict outcome of issues, mitigate impact of issues, and the like.

In some arrangements, the data being added to a data container may be received in one or more of a plurality of different formats. Accordingly, the selective data capture and translation computing platform 110 may reformat or translate the data to a desired format, common format, or the like. In some examples, the data may be translated prior to being stored in the data container.

Source computing device 1 120 and source computing device 2 125 may be any type of computing device, system, network, server, or the like that may execute systems and/or applications, capture data, detect potential issues, and the like. Source computing device 1 120 and/or source computing device 2 125 may be devices and/or systems used during the normal course of business of an enterprise and may be accessed and/or used by one or more users.

Local user computing device 150, 155 and remote user computing device 170, 175 may be configured to communicate with and/or connect to one or more computing devices or systems shown in FIG. 1A. For instance, local user computing device 150, 155 may communicate with one or more computing systems or devices via network 190, while remote user computing device 170, 175 may communicate with one or more computing systems or devices via network 195. In some examples, local user computing device 150, 155 may be used to access one or more entity systems, functions or processes. In some examples, local user computing device 150, 155 may be used to access the selective data capture and translation computing platform 110 and/or one or more of source computing device 120, 125 to control parameters of the system, update rules, modify settings, display notifications, and the like.

The remote user computing devices 170, 175 may be used to communicate with, for example, selective data capture and translation computing platform 110. For instance, remote user computing devices 170, 175 may include user computing devices, such as mobile devices including smartphones, tablets, laptop computers, and the like, that may be used to access selective data capture and translation computing platform 110, display notifications, and the like.

In one or more arrangements, source computing device 1 120, source computing device 2 125, local user computing device 150, local user computing device 155, remote user computing device 170, and/or remote user computing device 175 may be any type of computing device or combination of devices capable of performing the particular functions described herein. For example, source computing device 1 120, source computing device 2 125, local user computing device 150, local user computing device 155, remote user computing device 170, and/or remote user computing device 175 may, in some instances, be and/or include server computers, desktop computers, laptop computers, tablet computers, smart phones, or the like that may include one or more processors, memories, communication interfaces, storage devices, and/or other components. As noted above, and as illustrated in greater detail below, any and/or all of source computing device 1 120, source computing device 2 125, local user computing device 150, local user computing device 155, remote user computing device 170, and/or remote user computing device 175 may, in some instances, be special-purpose computing devices configured to perform specific functions.

Computing environment 100 also may include one or more computing platforms. For example, and as noted above, computing environment 100 may include selective data capture and translation computing platform 110. As illustrated in greater detail below, selective data capture and translation computing platform 110 may include one or more computing devices configured to perform one or more of the functions described herein. For example, selective data capture and translation computing platform 110 may include one or more computers (e.g., laptop computers, desktop computers, servers, server blades, or the like).

As mentioned above, computing environment 100 also may include one or more networks, which may interconnect one or more of selective data capture and translation computing platform 110, source computing device 1 120, source computing device 2 125, local user computing device 150, local user computing device 155, remote user computing device 170, and/or remote user computing device 175. For example, computing environment 100 may include private network 190 and public network 195. Private network 190 and/or public network 195 may include one or more sub-networks (e.g., Local Area Networks (LANs), Wide Area Networks (WANs), or the like). Private network 190 may be associated with a particular organization (e.g., a corporation, financial institution, educational institution, governmental institution, or the like) and may interconnect one or more computing devices associated with the organization. For example, selective data capture and translation computing platform 110, source computing device 1 120, source computing device 2 125, local user computing device 150, and local user computing device 155, may be associated with an organization (e.g., a financial institution), and private network 190 may be associated with and/or operated by the organization, and may include one or more networks (e.g., LANs, WANs, virtual private networks (VPNs), or the like) that interconnect selective data capture and translation computing platform 110, source computing device 1 120, source computing device 2 125, local user computing device 150, and local user computing device 155, and one or more other computing devices and/or computer systems that are used by, operated by, and/or otherwise associated with the organization. Public network 195 may connect private network 190 and/or one or more computing devices connected thereto (e.g., selective data capture and translation computing platform 110, source computing device 1 120, source computing device 2 125, local user computing device 150, local user computing device 155) with one or more networks and/or computing devices that are not associated with the organization. For example, remote user computing device 170, and/or remote user computing device 175 might not be associated with an organization that operates private network 190 (e.g., because remote user computing device 170 and remote user computing device 175 may be owned, operated, and/or serviced by one or more entities different from the organization that operates private network 190, such as a second entity different from the entity, one or more customers of the organization, public or government entities, and/or vendors of the organization, rather than being owned and/or operated by the organization itself or an employee or affiliate of the organization), and public network 195 may include one or more networks (e.g., the internet) that connect remote user computing device 170 and remote user computing device 175 to private network 190 and/or one or more computing devices connected thereto (e.g., selective data capture and translation computing platform 110, source computing device 1 120, source computing device 2 125, local user computing device 150, local user computing device 155).

Referring to FIG. 1B, selective data capture and translation computing platform 110 may include one or more processors 111, memory 112, and communication interface 113. A data bus may interconnect processor(s) 111, memory 112, and communication interface 113. Communication interface 113 may be a network interface configured to support communication between selective data capture and translation computing platform 110 and one or more networks (e.g., private network 190, public network 195, or the like). Memory 112 may include one or more program modules having instructions that when executed by processor(s) 111 cause selective data capture and translation computing platform 110 to perform one or more functions described herein and/or one or more databases that may store and/or otherwise maintain information which may be used by such program modules and/or processor(s) 111. In some instances, the one or more program modules and/or databases may be stored by and/or maintained in different memory units of selective data capture and translation computing platform 110 and/or by different computing devices that may form and/or otherwise make up selective data capture and translation computing platform 110.

For example, memory 112 may have, store and/or include a source data module 112a. Source data module 112a may store instructions and/or data that may cause or enable the selective data capture and translation computing platform 110 to receive data from one or more sources, such as source computing device 1 120, source computing device 2 125, or the like, and analyze the data (e.g., in conjunction with machine learning engine 112c and machine learning datasets 112d) to determine whether to generate a data container, add data to an existing data container, or the like.

Selective data capture and translation computing platform 110 may further have, store and/or include a container generation module 112b. Container generation module 112b may store instructions and/or data that may cause or enable the selective data capture and translation computing platform 110 to create or generate one or more data containers. In some examples, a data container may be generated in response to receiving data from one or more sources, such as source computing device 1 120, source computing device 2 125, or the like, that may include one or more system or network issues or events. Additionally or alternatively, container generation module 112b may pre-generate a data container. For instance, if a user, such as a system administrator or the like, is aware of historical issues that occur in one or more systems, applications, or the like, the user may cause the container generation module 112b to pre-generate a container (e.g., in advance or before an issue of that nature is detected or received from one or more sources).

In some examples, a generated data container may be pre-filled with data (e.g., historical data, data identified based on user experience, or the like). In some examples, data containers may be generated and/or pre-filled in advance of one or more systems being activated or coming online. For instance, if a new system, application, device, or the like, is being deployed, one or more data containers may be generated and/or pre-filled with data (e.g., data associated with historical issues that may be common, anticipated or the like) prior to the system, application, device, or the like, being activated or coming online. After the system, application, device, or the like, is activated or comes online, data may be collected from the system, application, device, or the like, and may be added to the one or more generated and/or pre-filled containers as appropriate (e.g., based on data linking the new data to the data container, based on similarities, based on issues identified, or the like).

In some arrangements, machine learning may be used to generated one or more data containers. For instance, selective data capture and translation computing platform 110 may have, store and/or include a machine learning engine 112c and machine learning datasets 112d. Machine learning engine 112c and machine learning datasets 112d may store instructions and/or data that may cause or enable selective data capture and translation computing platform 110 to evaluate incoming data from one or more sources (e.g., source computing device 1 120, source computing device 2 125, or the like) to determine whether a data container should be generated and/or generate a data container, to determine whether the incoming data should be added to an existing data container, or the like. The machine learning datasets 112d may be generated based on analyzed data (e.g., data from previously received data, previously identified issues, and the like), raw data, and/or received from one or more outside sources.

The machine learning engine 112c may receive source data and, using one or more machine learning algorithms, may generate one or more machine learning datasets 112d. Various machine learning algorithms may be used without departing from the invention, such as supervised learning algorithms, unsupervised learning algorithms, regression algorithms (e.g., linear regression, logistic regression, and the like), instance based algorithms (e.g., learning vector quantization, locally weighted learning, and the like), regularization algorithms (e.g., ridge regression, least-angle regression, and the like), decision tree algorithms, Bayesian algorithms, clustering algorithms, artificial neural network algorithms, and the like. Additional or alternative machine learning algorithms may be used without departing from the invention. In some examples, the machine learning engine 112c may analyze data to identify patterns of activity, sequences of activity, and the like, to generate one or more machine learning datasets 112d.

In some examples, the machine learning datasets 112d may include machine learning data linking one or more types of data, identified issues, identified systems or devices, or the like, to one or more data containers, categories associated with a container, or the like. For instance, the machine learning datasets 112d may include machine learning data linking one or more historical issues associated with a particular system to a container. As incoming data is analyzed using the machine learning datasets, the incoming data may be added to the data container based on identification of a same or similar issue to the historical issue.

In some examples, linking data may also be used to identify data for addition to one or more data containers. For instance, data tags may be added to incoming data and compared to data tags associated with data in one or more containers to identify an appropriate container to which the data should be added.

In some examples, less than all of the incoming data may be added to a data container. For instance, the data may be analyzed (e.g., using, for example, machine learning) to identify a portion of the data appropriate for addition to the data container. The identified portion may be added to the container and the remaining portion may be discarded or deleted, or may be added to a second, different container.

Selective data capture and translation computing platform 110 may further have, store and/or include a data translation module 112e. Data translation module 112e may store instructions and/or data that may cause or enable the selective data capture and translation computing platform 110 to reformat or translate data to another format. For instance, incoming data may include data in one or more different formats. In some examples, data translation module 112e may reformat data to a desired format, a predetermined format, or the like. In some examples, the data may be reformatted prior to being added to a data container.

Additionally or alternatively, data translation module 112e may generate a data translation layer extending between two or more data containers. For instance, data formats may differ between different data containers. Accordingly, data translation module 112e may generate a data translation layer enabling interlinking of the containers and data stored therein.

In some examples, data translation module 112e may further generate a client to analyst translation layer. In some arrangements, the client to analyst translation layer may format data from machine languages to natural language to enable use of the data by an analyst. Such arrangements may reduce errors in data interpretation by presenting the data in a natural language readable by all analysts.

FIGS. 2A-2E depict an illustrative event sequence for implementing and using selective data capture and translation functions in accordance with one or more aspects described herein. The events shown in the illustrative event sequence are merely one example sequence and additional events may be added, or events may be omitted, without departing from the invention.

Figure 2A:
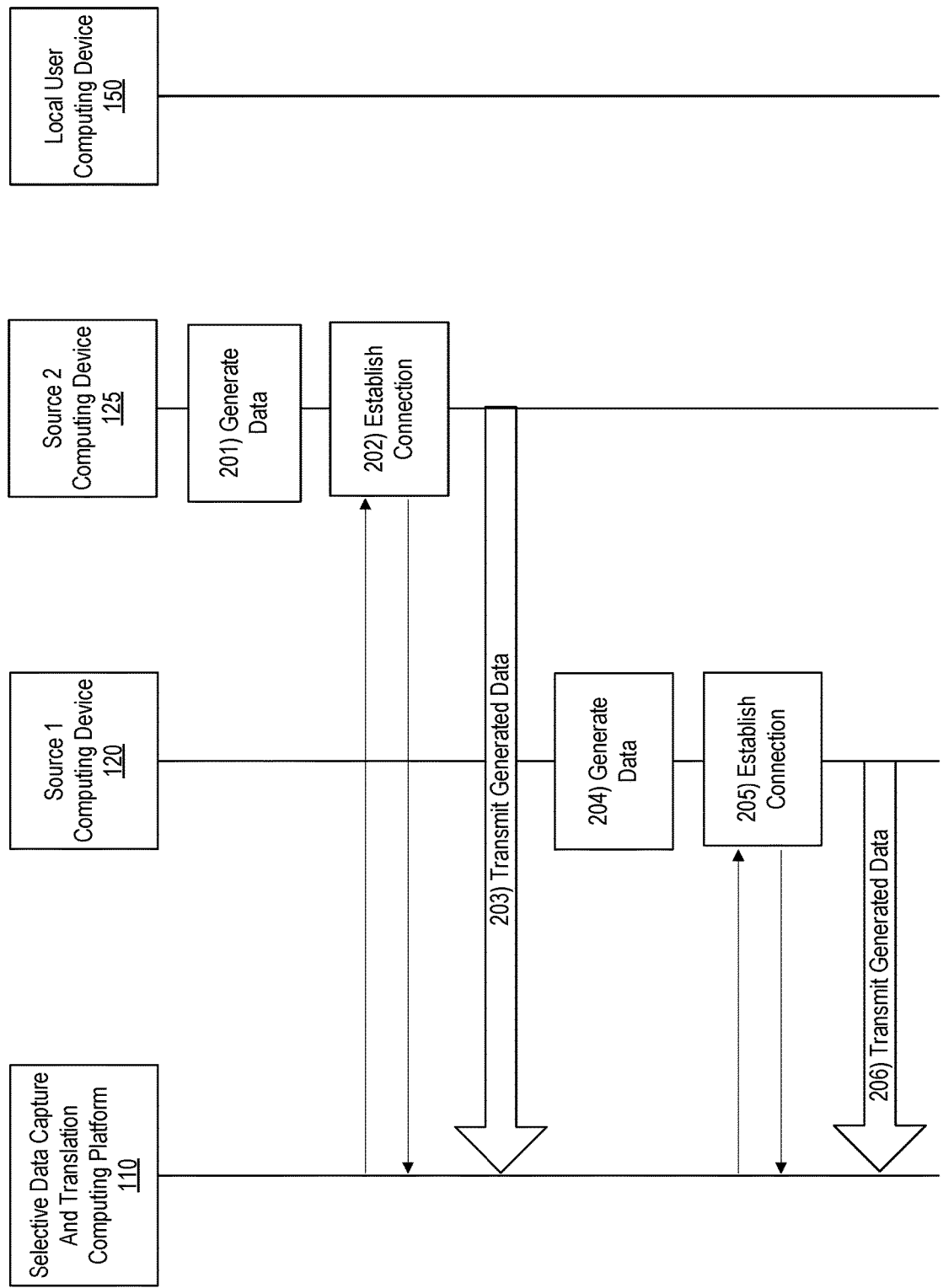

Referring to FIG. 2A, at step 201, data may be generated at a data source. For instance, data may be generated by, for example, source computing device 2 125. In some examples, the data may include data associated with a system, network, application, or the like, issue. In some arrangements, the data may include logs generated by the source computing device 2 125.

At step 202, a connection may be established between the source computing device 2 125 and the selective data capture and translation computing platform 110. For instance, a first wireless connection may be established between the source computing device 2 125 and the selective data capture and translation computing platform 110. Upon establishing the first wireless connection, a communication session may be initiated between the selective data capture and translation computing platform 110 and the source computing device 2 125.

At step 203, the generated data may be transmitted from source computing device 2 125 to the selective data capture and translation computing platform 110. For instance, the generated data may be transmitted during the communication session initiated upon establishing the first wireless connection.

At step 204, data may be generated at another or second data source. For instance, data may be generated by, for example, source computing device 1 120. In some examples, the data may include data associated with a system, network, application, or the like, issue. In some arrangements, the data may include logs generated by the source computing device 1 120. Although two data sources are shown and described, more or fewer data sources may be used without departing from the invention.

At step 205, a connection may be established between the source computing device 1 120 and the selective data capture and translation computing platform 110. For instance, a second wireless connection may be established between the source computing device 1 120 and the selective data capture and translation computing platform 110. Upon establishing the second wireless connection, a communication session may be initiated between the selective data capture and translation computing platform 110 and the source computing device 1 120.

At step 206, the generated data may be transmitted from source computing device 1 120 to the selective data capture and translation computing platform 110. For instance, the generated data may be transmitted during the communication session initiated upon establishing the second wireless connection.

With reference to FIG. 2B, at step 207, the data generated by the one or more sources may be received by the selective data capture and translation computing platform 110. At step 208, one or more data capture and/or translation functions may be activated or enabled. For instance, upon receiving data from one or more data sources, selective data capture and translation computing platform 110 may activate, initiate and/or enable one or more functions (e.g., that were previously disabled) to process the received data.

At step 209, one or more data containers may be generated. In some examples, the one or more data containers may be generated in response to receiving the generated data from the one or more data sources. In other examples, the one or more data containers may be pre-generated based on historical data or issues, or the like.

At step 210, the received data generated by the one or more data sources may be evaluated. For instance, in some examples, machine learning may be used to determine whether the received data should be added to one or more data containers, to which data container the data should be added, or the like. For example, the data may be evaluated using one or more machine learning rules (e.g., machine learning datasets) to determine how and/or where the data (or portion thereof) should be stored.

At step 211, the received and evaluated data may be added to one or more data containers. For instance, the data may be stored in an identified container. In some examples, the data may be formatted prior to being stored in the data container to correspond to a desired format, accepted format, or the like.

At step 212, additional data may be generated. For instance, additional data may be generated by one or more data sources, such as source computing device 2 125. The additional data may include data associated with one or more additional issues occurring at the source computing device, within an application executing thereon, associated with a network of which the device is a part, or the like.

Figure 2C:
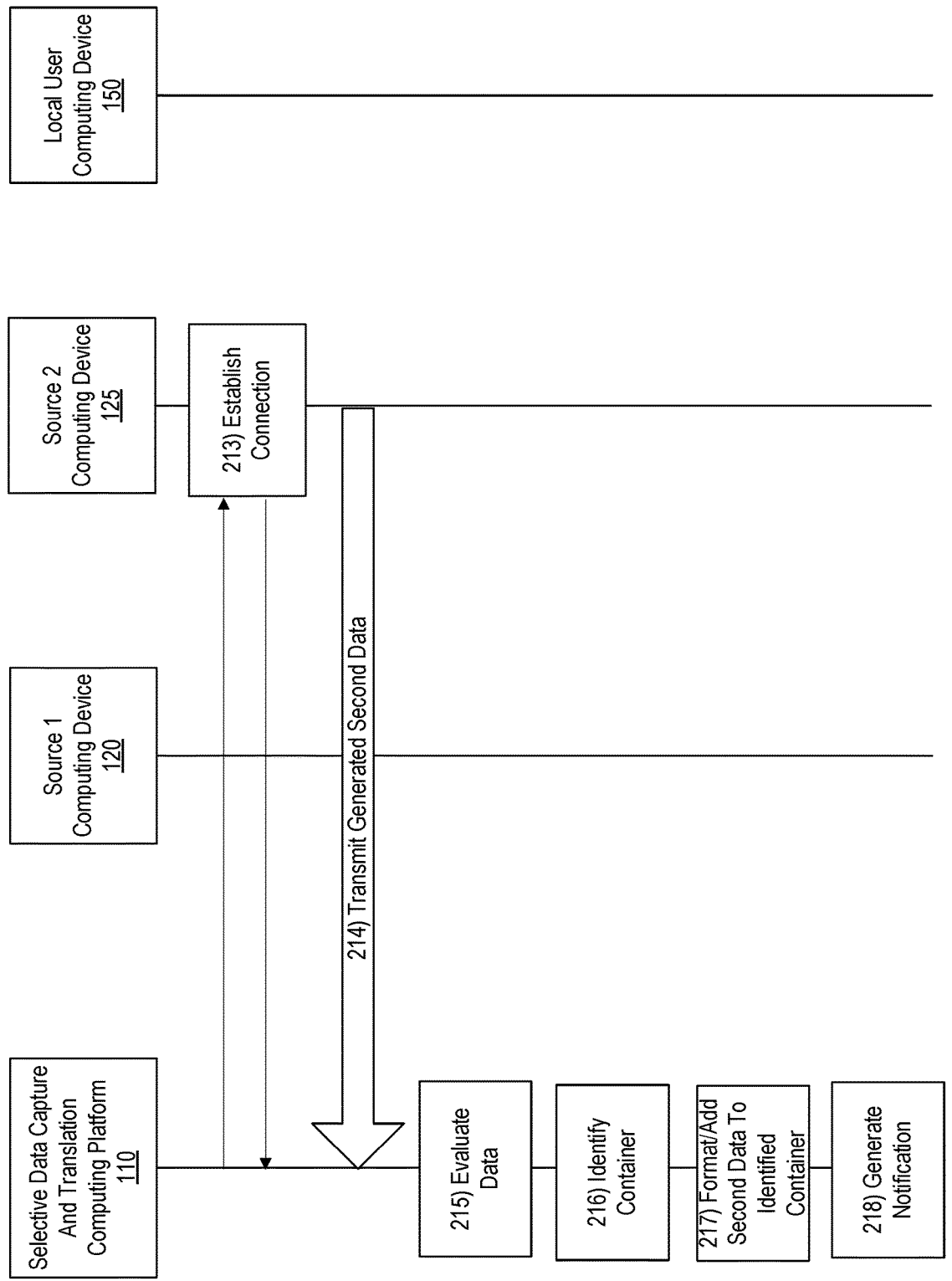

With reference to FIG. 2C, at step 213, a connection may be established between the source computing device 2 125 and the selective data capture and translation computing platform 110. For instance, a third wireless connection may be established between the source computing device 2 125 and the selective data capture and translation computing platform 110. Upon establishing the third wireless connection, a communication session may be initiated between the selective data capture and translation computing platform 110 and the source computing device 2 125.

At step 214, the generated additional data may be transmitted from source computing device 2 125 to the selective data capture and translation computing platform 110. For instance, the generated additional data may be transmitted during the communication session initiated upon establishing the third wireless connection.

At step 215, the generated additional data may be received by the selective data capture and translation computing platform 110 and may be evaluated. For instance, machine learning may be used to determine whether the received additional data should be added to one or more data containers.

At step 216, the selective data capture and translation computing platform 110 may identify one or more data containers to which the additional data should be added. At step 217, the additional data may be formatted, as needed or desired, and may be added to the existing identified container.

At step 218, a notification may be generated indicating that the additional data was added to the identified container.

Figure 2D:
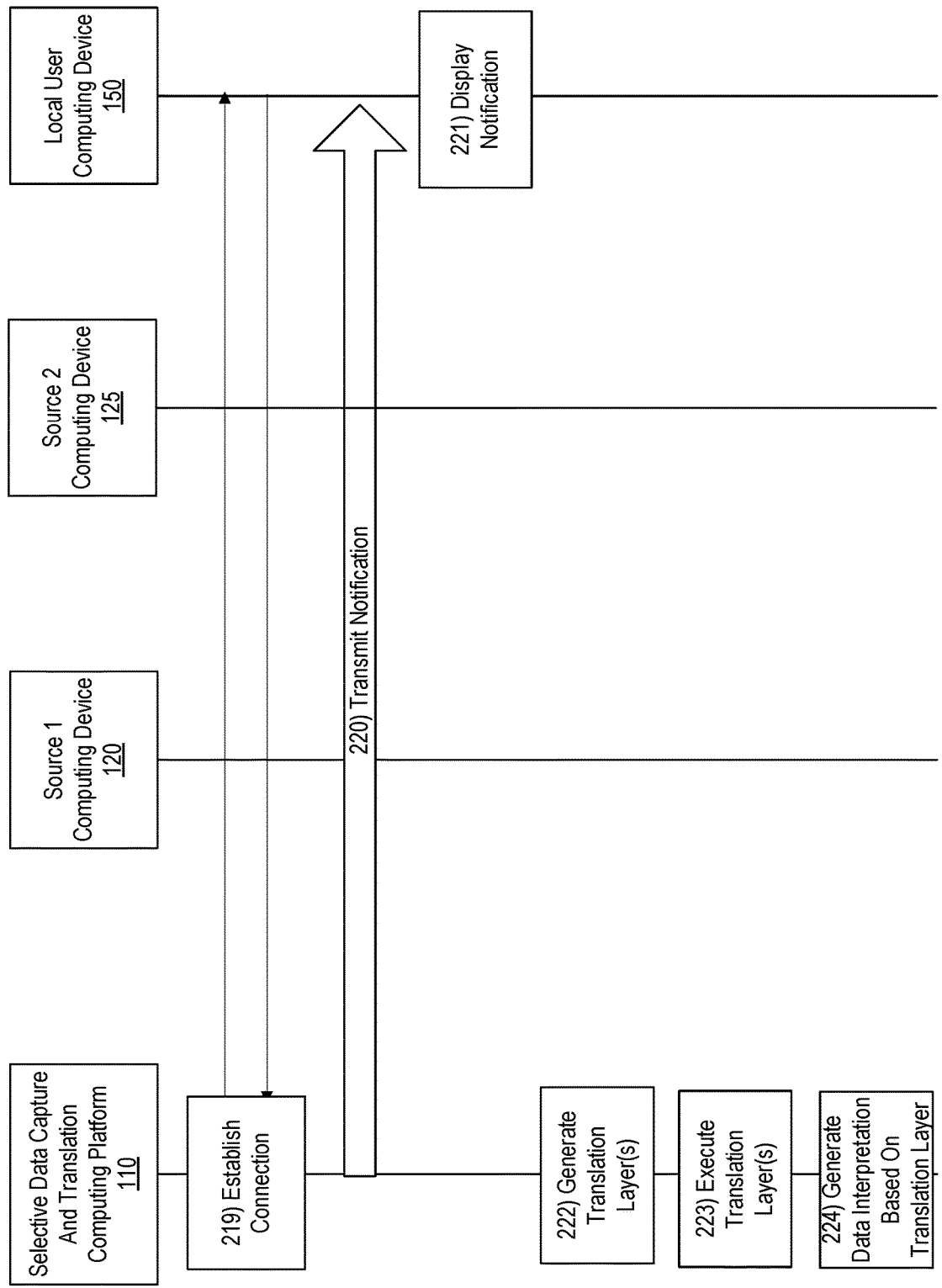

With reference to FIG. 2D, at step 219, a connection may be established between the selective data capture and translation computing platform 110 and local user computing device 150. For instance, a fourth wireless connection may be established between the selective data capture and translation computing platform 110 and the local user computing device 150. Upon establishing the fourth wireless connection, a communication session may be initiated between the selective data capture and translation computing platform 110 and the local user computing device 150.

At step 220, the generated notification may be transmitted from the selective data capture and translation computing platform 110 to the local user computing device 150. For instance, the generated notification may be transmitted during the communication session initiated upon establishing the fourth wireless connection. At step 221, the notification may be displayed by the local user computing device 150.

At step 222, one or more translation layers may be generated. For instance, a translation layer may be generated to enable communication between data containers. For example, one or more formatting or reformatting processes may be executed to enable communication between one or more containers including data of different types.

In another example, a translation layer may be generated to format machine readable language into language readable by a human analyst or other user to reduce errors in interpreting the data.

At step 223, the one or more generated translation layers may be executed. At step 224, a data interpretation based on the one or more translation layers may be generated. For instance, data in machine readable language may be translation to language readable by a user in order to reduce errors in interpreting the data, ensure a common interpretation is used by all analysts, or the like.

Figure 2E:
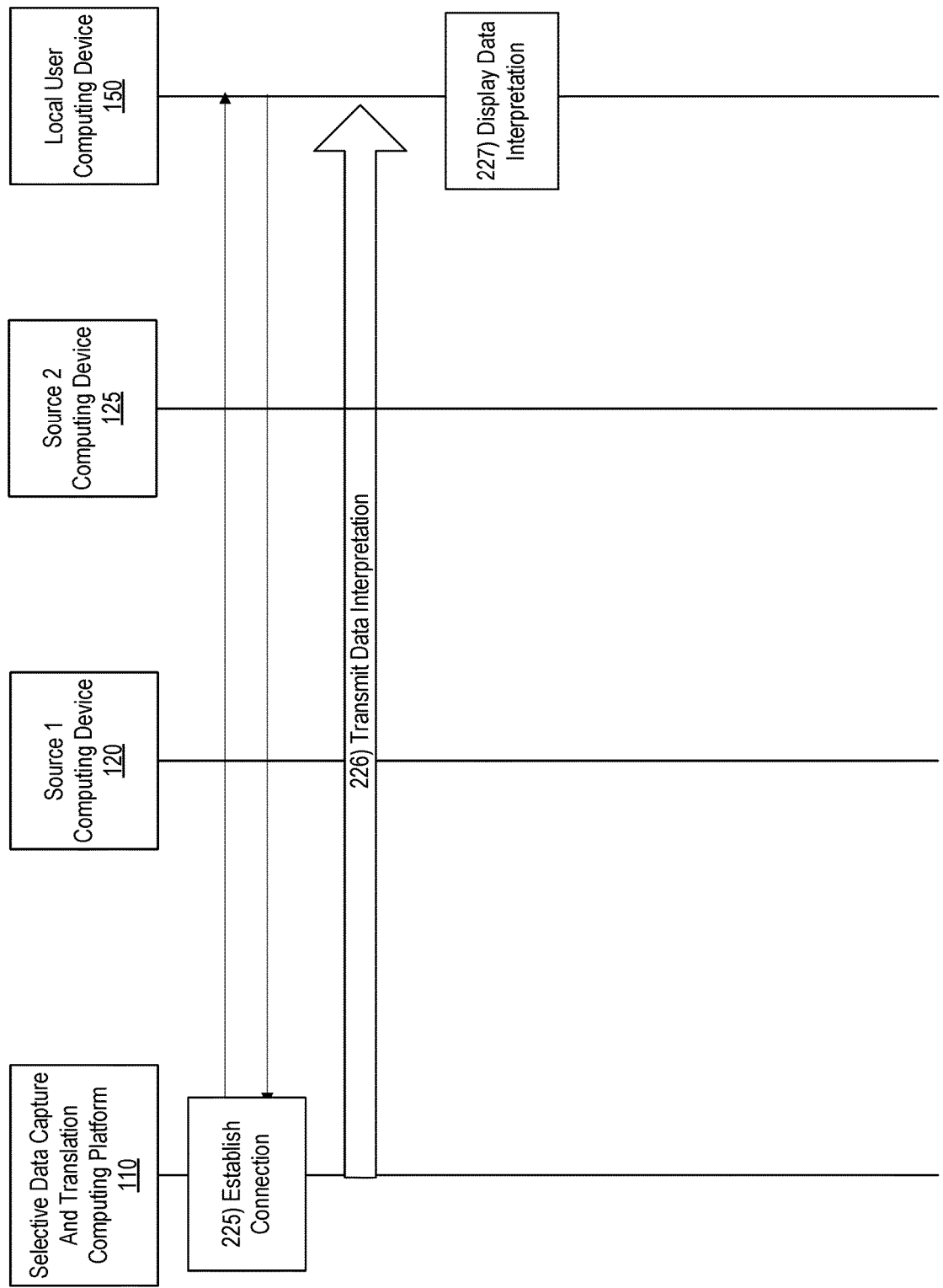

With reference to FIG. 2E, at step 225, a connection may be established between the the selective data capture and translation computing platform 110 and local user computing device 150. For instance, a fifth wireless connection may be established between the selective data capture and translation computing platform 110 and the local user computing device 150. Upon establishing the fifth wireless connection, a communication session may be initiated between the selective data capture and translation computing platform 110 and the local user computing device 150.

At step 226, the generated data interpretation may be transmitted from the selective data capture and translation computing platform 110 to the local user computing device 150. For instance, the generated data interpretation may be transmitted during the communication session initiated upon establishing the fifth wireless connection. At step 221,7 the data interpretation may be displayed by the local user computing device 150. Accordingly, the data interpretation may be used to evaluate one or more issues, implement process to avoid or mitigate impact from an issue, or the like.

Figure 3:
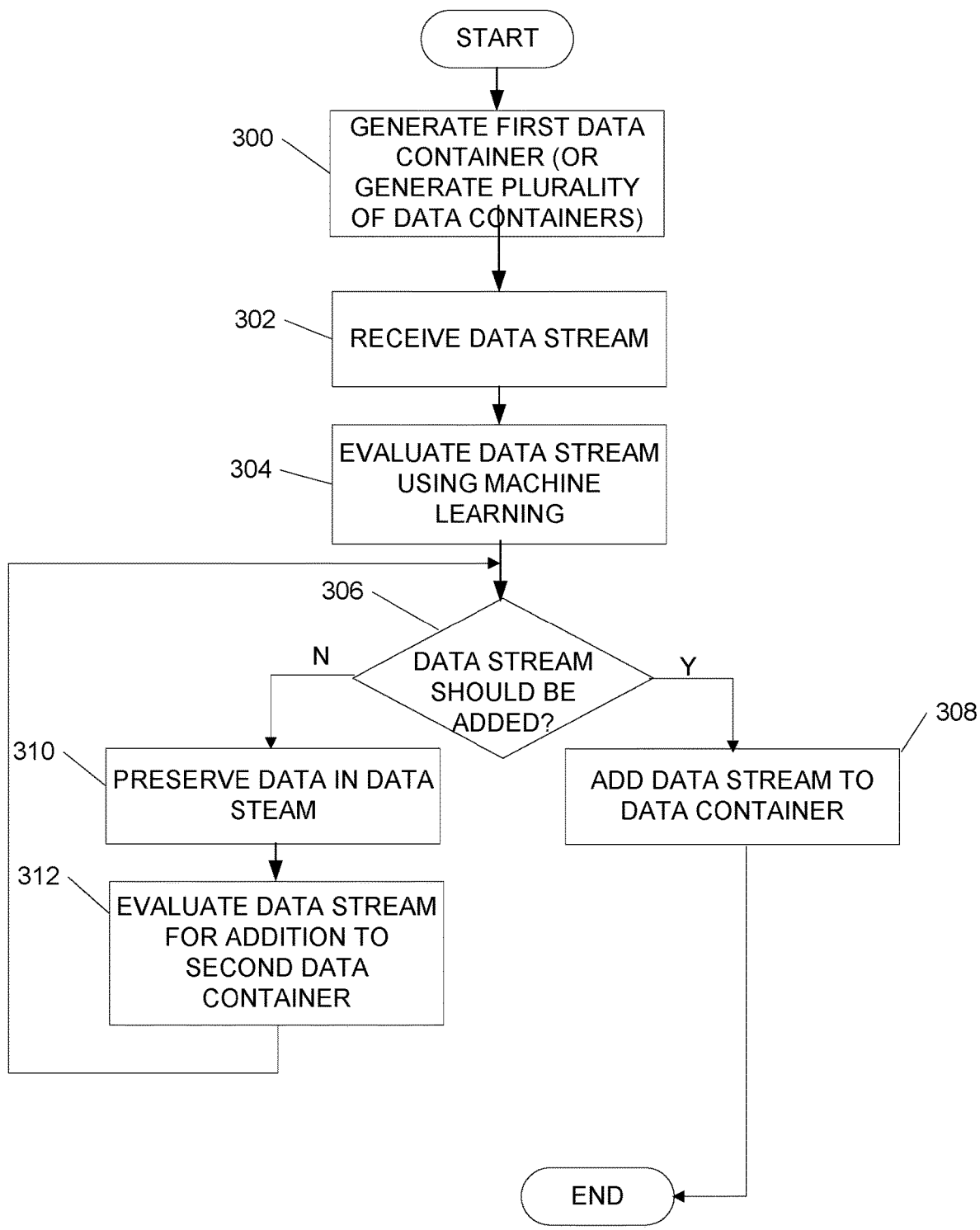
FIG. 3 depicts an illustrative method for implementing and using a system to perform selective data capture and translation functions, according to one or more aspects described herein.

FIG. 3 is a flow chart illustrating one example method of providing selective data capture and translation functions according to one or more aspects described herein. The processes illustrated in FIG. 3 are merely some example processes and functions. The steps shown may be performed in a different order, more steps may be added, or one or more steps may be omitted without departing from the invention.

At step 300, one or more data containers may be generated. For instance, in some examples, a data container may include an enclosed or otherwise restricted data container into which only predetermined types of data may be added. In some examples, the data container may include data associated with one or more system issues. Accordingly, as data is added to the data container, the volume of data available to evaluate and resolve future issues is increased and accuracy is improved.

In some examples, a data container may be generated prior to a system being activated or put into use. For instance, one or more data containers may be generated based on historical data associated with issues that are likely to impact a system, user or analyst experience, or the like. Additionally or alternatively, one or more data containers may be generated in response to detection of a new or recent issue impacting a system.

At step 302, a data stream may be received. For instance, a data stream may be received by a selective data capture and translation computing platform 110. In some examples, the data stream may be data associated with a current issue impacting one or more systems or may be one or more logs generated by one or more systems.

At step 304, the received data stream may be evaluated to determine whether the data stream should be added to a first data container. For instance, in some examples, machine learning may be used to evaluate the data stream. Data within the data stream may be compared to one or more machine learning datasets to predict whether the data within the data stream should be added to a first data container.

At step 306, a determination may be made as to whether the received data stream should be added to a first data container. If so, the data may be absorbed into the first data container at step 308. In some examples, absorbing data into the first data container may include translating the received data stream to a format or other criteria for later use by an analyst, another system, or the like. In some examples, data within the data container may be translated to provide a single, uniform presentation of data that may be reviewed by multiple analysts but that may have a consistent translation or reduce issues with data interpretation and may increase accuracy.

If, at step 306, a determination is made that the data stream should not be absorbed into the first data container, the data may be preserved at step 310. For instance, the data may be stored in a data store separate from the data container. At step 312, the preserved data may be further evaluated and/or analyzed to determine whether the data should be absorbed into a second data container. For instance, the data may be evaluated using machine learning to determine whether the data should be absorbed into one or more other data containers different from the first data container. The process may then return to step 306 to determine whether the data should be stored in a data container.

Aspects described herein provide for improved grouping of data for use in building historical information associated with system issues and impacts. The arrangements described herein provide for high level grouping of issue data (e.g., by storing relevant data in a data container) in order to quickly identify and implement processes to address an issue, mitigate impact, etc., and may be used to further understand and anticipate future issues. The arrangements further provide for translation of data to simplify data for use between different systems and to provide a consistent interpretation of the data for use by one or more systems, analysts, or the like.

As discussed herein, as additional data and/or data streams are received, the data may be evaluated to determine whether it should be added to an existing container, whether a new data container should be generated, and the like. In some examples, additional data being added to an existing container may include one more steps taken to address an issue, a result of those steps taken, and the like, so that information associated with both issues and possible resolutions of issues may be stored together in an easily accessible data container.

As discussed herein, although machine learning may be used to evaluate data, determine whether data should be stored in one or more data containers, identify a data container, and the like, in some arrangements, data tagging may also be used (either in addition to machine learning or in lieu of machine learning). For instance, data associated with an issue, device, system, or the like, may be tagged and the tags may be used to identify an appropriate data container. For example, a data tag on incoming data may be compared to data tags associated with one or more existing data containers. If a match exists, the data may be added to the data containing having the matching data tag.

In some examples, a data container may include a sub-container. The sub-container may be within the data container and may include data matching more narrowly defined criteria (e.g., a particular type of issue within a data container associated with an application, a particular application and issue within a data container associated with the issue or application, or the like). These sub-containers may further aid in quickly identifying and access information that may be used to address issues.

The above-described examples and arrangements are merely some example arrangements in which the systems described herein may be used. Various other arrangements employing aspects described herein may be used without departing from the invention.

Figure 4:
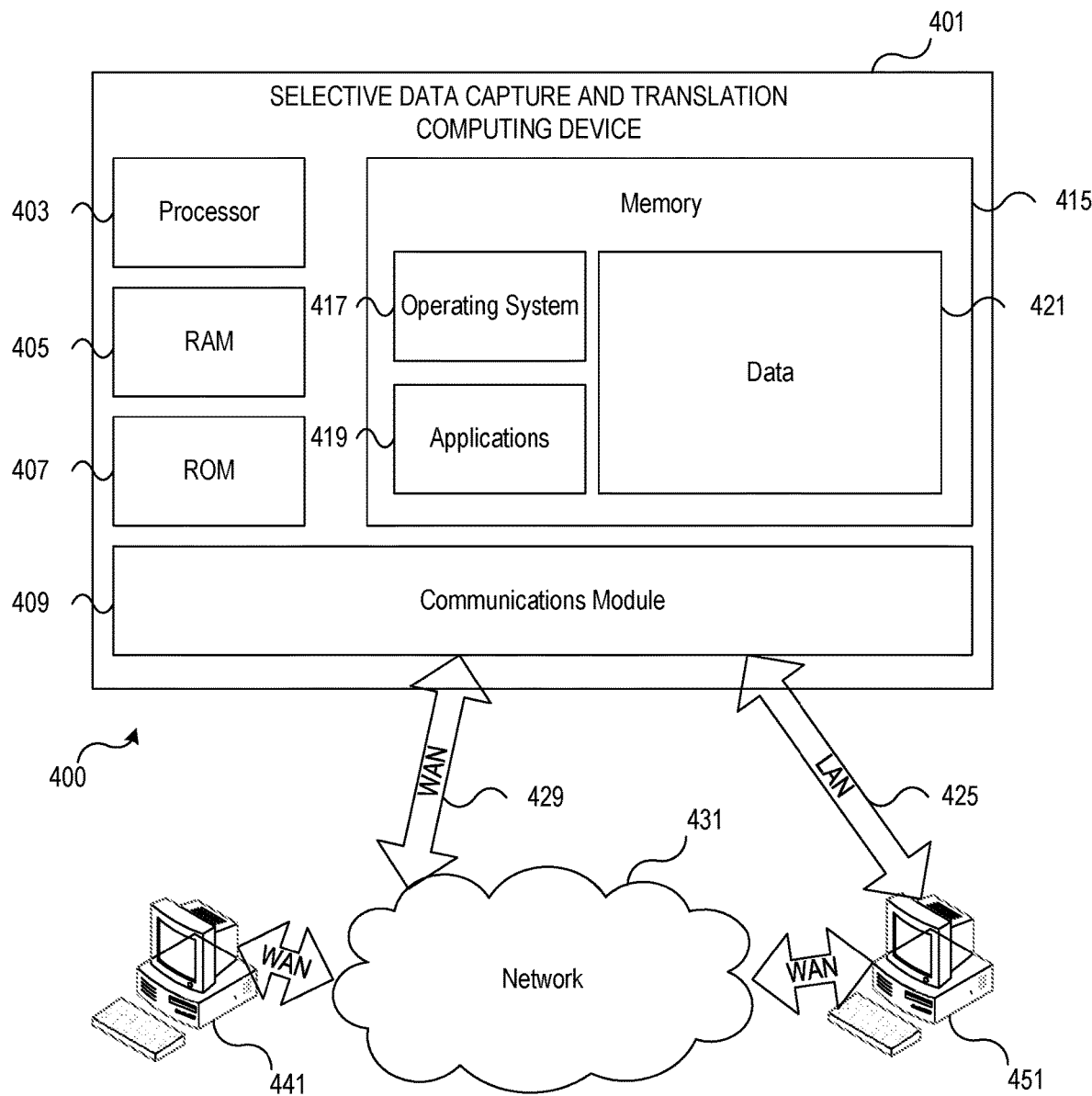
FIG. 4 illustrates one example operating environment in which various aspects of the disclosure may be implemented in accordance with one or more aspects described herein.

FIG. 4 depicts an illustrative operating environment in which various aspects of the present disclosure may be implemented in accordance with one or more example embodiments. Referring to FIG. 4, computing system environment 400 may be used according to one or more illustrative embodiments. Computing system environment 400 is only one example of a suitable computing environment and is not intended to suggest any limitation as to the scope of use or functionality contained in the disclosure. Computing system environment 400 should not be interpreted as having any dependency or requirement relating to any one or combination of components shown in illustrative computing system environment 400.

Computing system environment 400 may include selective data capture and translation computing device 401 having processor 403 for controlling overall operation of selective data capture and translation computing device 401 and its associated components, including Random Access Memory (RAM) 405, Read-Only Memory (ROM) 407, communications module 409, and memory 415. Selective data capture and translation computing device 401 may include a variety of computer readable media. Computer readable media may be any available media that may be accessed by selective data capture and translation computing device 401, may be non-transitory, and may include volatile and nonvolatile, removable and non-removable media implemented in any method or technology for storage of information such as computer-readable instructions, object code, data structures, program modules, or other data. Examples of computer readable media may include Random Access Memory (RAM), Read Only Memory (ROM), Electronically Erasable Programmable Read-Only Memory (EEPROM), flash memory or other memory technology, Compact Disk Read-Only Memory (CD-ROM), Digital Versatile Disk (DVD) or other optical disk storage, magnetic cassettes, magnetic tape, magnetic disk storage or other magnetic storage devices, or any other medium that can be used to store the desired information and that can be accessed by computing device 401.

Although not required, various aspects described herein may be embodied as a method, a data transfer system, or as a computer-readable medium storing computer-executable instructions. For example, a computer-readable medium storing instructions to cause a processor to perform steps of a method in accordance with aspects of the disclosed embodiments is contemplated. For example, aspects of method steps disclosed herein may be executed on a processor on selective data capture and translation computing device 401. Such a processor may execute computer-executable instructions stored on a computer-readable medium.

Software may be stored within memory 415 and/or storage to provide instructions to processor 403 for enabling selective data capture and translation computing device 401 to perform various functions as discussed herein. For example, memory 415 may store software used by selective data capture and translation computing device 401, such as operating system 417, application programs 419, and associated database 421. Also, some or all of the computer executable instructions for selective data capture and translation computing device 401 may be embodied in hardware or firmware. Although not shown, RAM 405 may include one or more applications representing the application data stored in RAM 405 while selective data capture and translation computing device 401 is on and corresponding software applications (e.g., software tasks) are running on selective data capture and translation computing device 401.

Communications module 409 may include a microphone, keypad, touch screen, and/or stylus through which a user of selective data capture and translation computing device 401 may provide input, and may also include one or more of a speaker for providing audio output and a video display device for providing textual, audiovisual and/or graphical output. Computing system environment 400 may also include optical scanners (not shown).

Selective data capture and translation computing device 401 may operate in a networked environment supporting connections to one or more remote computing devices, such as computing devices 441 and 451. Computing devices 441 and 451 may be personal computing devices or servers that include any or all of the elements described above relative to selective data capture and translation computing device 401.

The network connections depicted in FIG. 4 may include Local Area Network (LAN) 425 and Wide Area Network (WAN) 429, as well as other networks. When used in a LAN networking environment, selective data capture and translation computing device 401 may be connected to LAN 425 through a network interface or adapter in communications module 409. When used in a WAN networking environment, selective data capture and translation computing device 401 may include a modem in communications module 409 or other means for establishing communications over WAN 429, such as network 431 (e.g., public network, private network, Internet, intranet, and the like). The network connections shown are illustrative and other means of establishing a communications link between the computing devices may be used. Various well-known protocols such as Transmission Control Protocol/Internet Protocol (TCP/IP), Ethernet, File Transfer Protocol (FTP), Hypertext Transfer Protocol (HTTP) and the like may be used, and the system can be operated in a client-server configuration to permit a user to retrieve web pages from a web-based server.

The disclosure is operational with numerous other computing system environments or configurations. Examples of computing systems, environments, and/or configurations that may be suitable for use with the disclosed embodiments include, but are not limited to, personal computers (PCs), server computers, hand-held or laptop devices, smart phones, multiprocessor systems, microprocessor-based systems, set top boxes, programmable consumer electronics, network PCs, minicomputers, mainframe computers, distributed computing environments that include any of the above systems or devices, and the like that are configured to perform the functions described herein.

Figure 5:
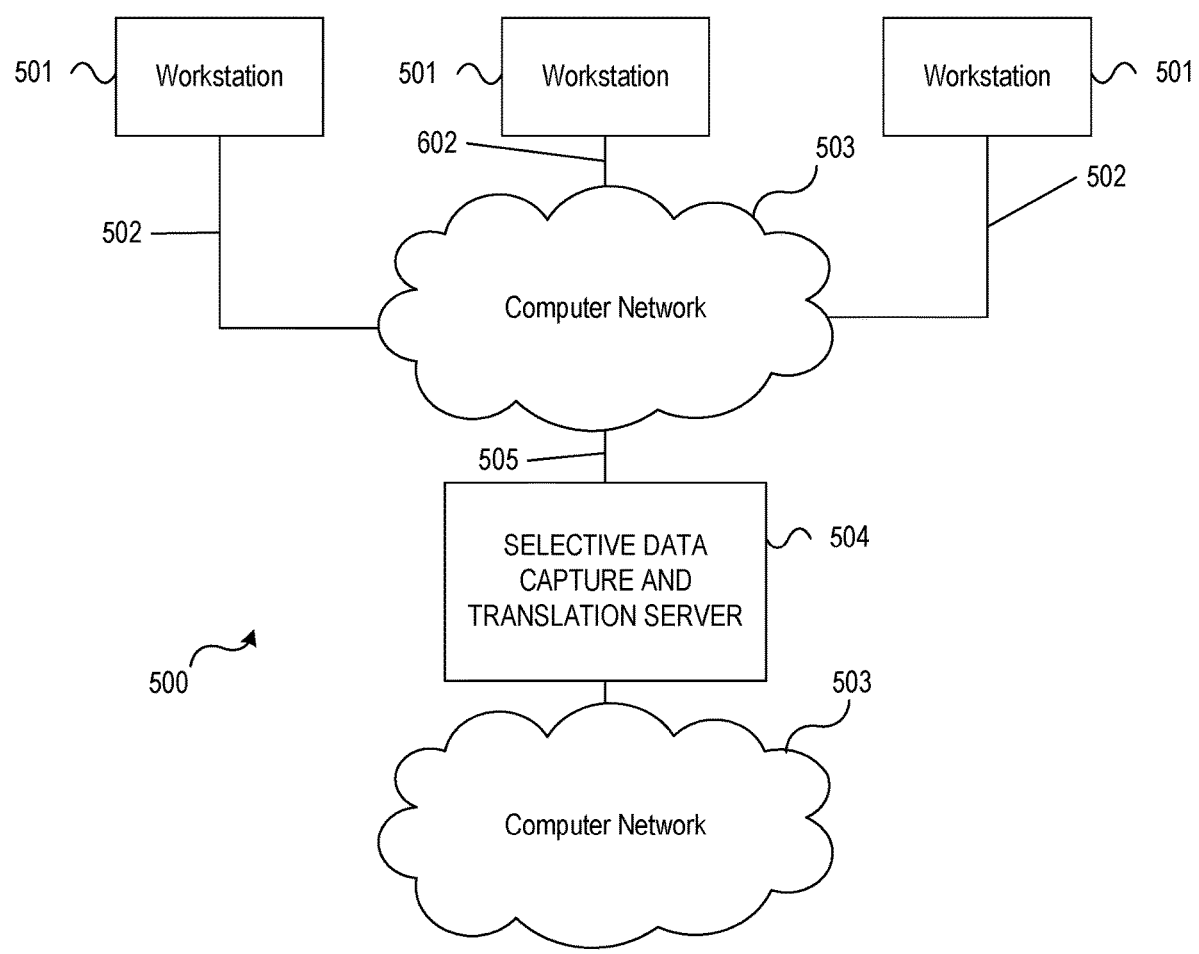
FIG. 5 depicts an illustrative block diagram of workstations and servers that may be used to implement the processes and functions of certain aspects of the present disclosure in accordance with one or more aspects described herein.

FIG. 5 depicts an illustrative block diagram of workstations and servers that may be used to implement the processes and functions of certain aspects of the present disclosure in accordance with one or more example embodiments. Referring to FIG. 5, illustrative system 500 may be used for implementing example embodiments according to the present disclosure. As illustrated, system 500 may include one or more workstation computers 501. Workstation 501 may be, for example, a desktop computer, a smartphone, a wireless device, a tablet computer, a laptop computer, and the like, configured to perform various processes described herein. Workstations 501 may be local or remote, and may be connected by one of communications links 502 to computer network 503 that is linked via communications link 505 to selective data capture and translation server 504. In system 500, selective data capture and translation server 504 may be a server, processor, computer, or data processing device, or combination of the same, configured to perform the functions and/or processes described herein. Server 504 may be used to receive data, generate one or more containers, evaluate received data, add data to containers, generate translation layers, execute translation layers, and the like.

Computer network 503 may be any suitable computer network including the Internet, an intranet, a Wide-Area Network (WAN), a Local-Area Network (LAN), a wireless network, a Digital Subscriber Line (DSL) network, a frame relay network, an Asynchronous Transfer Mode network, a Virtual Private Network (VPN), or any combination of any of the same. Communications links 502 and 505 may be communications links suitable for communicating between workstations 501 and selective data capture and translation server 504, such as network links, dial-up links, wireless links, hard-wired links, as well as network types developed in the future, and the like.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, Application-Specific Integrated Circuits (ASICs), Field Programmable Gate Arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, one or more steps described with respect to one figure may be used in combination with one or more steps described with respect to another figure, and/or one or more depicted steps may be optional in accordance with aspects of the disclosure.

What is claimed is:

1. A computing platform, comprising:
   at least one processor;
   a communication interface communicatively coupled to the at least one processor; and
   memory storing computer-readable instructions that, when executed by the at least one processor, cause the computing platform to:
      generate a plurality of data containers, each data container associated with a type of issue and each data container including at least one sub-container associated with a particular application associated with the type of issue;
      receive a data stream including data associated with one or more issues associated with one or more systems;
      evaluate, using machine learning, first data from the data stream to predict whether first data from the data stream should be added to a first data container of the generated plurality of data containers based on an identified type of issue in the first data from the data stream;
      responsive to determining the first data from the data stream should be added to the first data container:
         add the first data to the first data container; and
         evaluate the first data to determine whether it should be added to one or more sub-containers within the first data container; and
      responsive to determining the first data from the data stream should not be added to the first data container, preserve the first data from the data stream and further evaluate the first data from the data stream to determine whether it should be added to a second data container of the plurality of data containers.

2. The computing platform of claim 1, wherein further evaluating the first data from the data stream to determine whether it should be added to the second data container of the plurality of data containers is performed using machine learning.

3. The computing platform of claim 1, further including instructions that, when executed, cause the computing platform to:
   generate one or more translation layers.

4. The computing platform of claim 3, further including instructions that, when executed, cause the computing platform to:
   execute the generated one or more translation layers.

5. The computing platform of claim 3, wherein the generated one or more translation layers includes a translation layer to enable communication between two or more data containers of the plurality of data containers.

6. The computing platform of claim 3, wherein the generated one or more translation layers includes a translation layer translating machine readable data to a natural language readable by an analyst.

7. The computing platform of claim 1, further including instructions that, when executed, cause the computing platform to: format the first data from the data stream prior to adding it to the first data container.

8. A method, comprising:
   at a computing platform comprising at least one processor, memory, and a communication interface:
      generating, by the at least one processor, a plurality of data containers, each data container associated with a type of issue and each data container including at least one sub-container associated with a particular application associated with the type of issue;
      receiving, by the at least one processor and via the communication interface, a data stream including data associated with one or more issues associated with one or more systems;
      evaluating, by the at least one processor and using machine learning, the data stream to predict whether first data from the data stream should be added to a first data container of the generated plurality of data containers based on an identified type of issue in the first data from the data stream;
      responsive to determining the data from the data stream should be added to the first data container:
         adding, by the at least one processor, the data to the first data container; and
         evaluating the first data to determine whether it should be added to one or more sub-containers within the first data container; and
      responsive to determining the first data from the data stream should not be added to the first data container, preserving, by the at least one processor, the first data from the data stream and further evaluating, by the at least one processor, the first data from the data stream to determine whether it should be added to a second data container of the plurality of data containers.

9. The method of claim 8, wherein further evaluating the first data from the data stream to determine whether it should be added to the second data container of the plurality of data containers is performed using machine learning.

10. The method of claim 8, further including:
    generating, by the at least one processor, one or more translation layers.

11. The method of claim 10, further including:
    executing, by the at least one processor, the generated one or more translation layers.

12. The method of claim 10, wherein the generated one or more translation layers includes a translation layer to enable communication between two or more data containers of the plurality of data containers.

13. The method of claim 10, wherein the generated one or more translation layers includes a translation layer translating machine readable data to a natural language readable by an analyst.

14. The method of claim 8, further including instructions that, when executed, cause the computing platform to: format the first data from the data stream prior to adding it to the first data container.

15. One or more non-transitory computer-readable media storing instructions that, when executed by a computing platform comprising at least one processor, memory, and a communication interface, cause the computing platform to:
generate a plurality of data containers, each data container associated with a type of issue and each data container including at least one sub-container associated with a particular application associated with the type of issue;
receive a data stream including data associated with one or more issues associated with one or more systems;
evaluate, using machine learning, first data from the data stream to predict whether the first data from the data stream should be added to a first data container of the generated plurality of data containers based on an identified type of issue in the first data from the data stream;
responsive to determining the first data from the data stream should be added to the first data container:
add the first data to the first data container; and
evaluate the first data to determine whether it should be added to one or more sub-containers within the first data container; and
responsive to determining the first data from the data stream should not be added to the first data container, preserve the first data from the data stream and further evaluate the first data from the data stream to determine whether it should be added to a second data container of the plurality of data containers.

16. The one or more non-transitory computer-readable media of claim 15, wherein further evaluating the first data from the data stream to determine whether it should be added to the second data container of the plurality of data containers is performed using machine learning.

17. The one or more non-transitory computer-readable media of claim 15, further including instructions that, when executed, cause the computing platform to:
generate one or more translation layers.

18. The one or more non-transitory computer-readable media of claim 17, further including instructions that, when executed, cause the computing platform to:
execute the generated one or more translation layers.

19. The one or more non-transitory computer-readable media of claim 17, wherein the generated one or more translation layers includes a translation layer to enable communication between two or more data containers of the plurality of data containers.

20. The one or more non-transitory computer-readable media of claim 17, wherein the generated one or more translation layers includes a translation layer translating machine readable data to a natural language readable by an analyst.

21. The one or more non-transitory computer-readable media of claim 15, further including instructions that, when executed, cause the computing platform to: format the first data from the data stream prior to adding it to the first data container.

* * * * *